United States Patent [19]
Bastian et al.

[11] Patent Number: 6,010,565
[45] Date of Patent: Jan. 4, 2000

[54] FOAMED MATERIAL FOR FIREPROOFING AND/OR INSULATING

[75] Inventors: Wolfgang Bastian, Dreieich; Horst Kempf, Selb; Jörg Lind, Ludwigshafen; Thomas Schmidt-Hansberg, Usingen, all of Germany

[73] Assignee: Metallgesellschaft Aktiengesellschaft, Frankfurt am Main, Germany

[21] Appl. No.: 09/214,675

[22] PCT Filed: Jul. 3, 1997

[86] PCT No.: PCT/EP97/03517

§ 371 Date: Mar. 2, 1999

§ 102(e) Date: Mar. 2, 1999

[87] PCT Pub. No.: WO98/02393

PCT Pub. Date: Jan. 22, 1998

[30] Foreign Application Priority Data

Jul. 16, 1996 [DE] Germany .......................... 196 28 553

[51] Int. Cl.$^7$ .................................................... C08K 21/14
[52] U.S. Cl. .............................. 106/122; 521/85; 521/91; 521/92; 521/96; 521/99; 521/103; 521/125; 521/126; 521/141; 521/143; 521/906; 521/907; 523/179

[58] Field of Search .................................. 523/179; 521/85, 521/91, 92, 96, 99, 103, 125, 126, 141, 143; 106/122

[56] References Cited

U.S. PATENT DOCUMENTS

| | | | |
|---|---|---|---|
| 5,082,877 | 1/1992 | Raevsky et al. | 523/179 |
| 5,175,197 | 12/1992 | Gestner et al. | 523/179 |
| 5,401,793 | 3/1995 | Kobayashi et al. | 523/179 |
| 5,834,535 | 11/1998 | Abu-Isa | 523/179 |

*Primary Examiner*—Morton Foelak
*Attorney, Agent, or Firm*—Herbert Dubno

[57] ABSTRACT

This invention relates to a foamed material for fireproofing and/or insulating purposes, consisting of 30 to 90 parts by weight of a solution that contains 20 to 70 wt-% $Al(H_2PO_4)_3$ and 30 to 80 wt-% water, 5 to 55 parts by weight of a mixture that contains 10 to 70 wt-% MgO, 0 to 70 wt-% mica, 0 to 70 wt-% aluminium hydroxide and 1 to 20 wt-% $MnO_2$, as well as 1 to 30 parts by weight of a foaming agent that contains 3 to 33 wt-% $H_2O_2$ and 67 to 97 wt-% water. In accordance with the invention, the term "insulating purposes" refers to the use of the inventive foamed material for heat and sound insulation.

9 Claims, No Drawings

FOAMED MATERIAL FOR FIREPROOFING AND/OR INSULATING

DESCRIPTION

This invention relates to a foamed material for fireproofing and/or insulating purposes, consisting of 30 to 90 parts by weight of a solution that contains 20 to 70 wt-% $Al(H_2PO_4)_3$ and 30 to 80 wt-% water, 5 to 55 parts by weight of a mixture that contains 10 to 70 wt-% MgO, 0 to 70 wt-% mica, 0 to 70 wt-% aluminium hydroxide and 1 to 20 wt-% $MnO_2$, as well as 1 to 30 parts by weight of a foaming agent that contains 3 to 33 wt-% $H_2O_2$ and 67 to 97 wt-% water. In accordance with the invention, the term "insulating purposes" refers to the use of the inventive foamed material for heat and sound insulation.

From DE-OS 27 56 198 there is known an inorganic foamed material on the basis of metallic salts of phosphoric acid, where the ratio of the total number of metal atoms forming the salts to the total number of phosphorus atoms is 2:3 to 2:1, and where the metals forming the salts comprise at least one polyvalent metal, where the equivalence ratio of the total valences of the metal to the total valences of the phosphate ion is 0.65 to 0.95. The known foamed material consists of discrete cells with an average diameter of 3 mm or less and has a specific gravity smaller than 0.15. The polyvalent metal of the foamed material is at least a divalent and/or trivalent metal, where as polyvalent metal there is preferably used magnesium, zinc and/or aluminium. In addition, the foamed material contains an alkali metal. The foamed material includes aggregate, reinforcing materials and fillers. The foamed material may also include hydrophobic groups, which are chemically bound to the metal phosphate, and which are organic nitrogen or phosphorus compounds. The known foamed material can be used for heat insulation. The foamed material is produced from a metal phosphate with at least one polyvalent metal, a carbonate of a polyvalent metal and water, where the mixture foams and is cured at normal temperature.

From EP-PS 0 136 378 there is known a two-component system for forming an inorganic resin which can be used as material for fireproofing and heat insulation. The two-component system consists of a liquid component A, which contains an aqueous solution of aluminium dihydrogen phosphate and/or magnesium hydrogen phosphate, and of a liquid component B, which contains an aqueous suspension of a phosphate-reactive constituent, which is wollastonite, $Ca_3(Si_3O_9)$ and/or magnesium oxide, where the viscosity of each component is chosen such that the two components can be mixed quickly and thoroughly by forming a slurry which reacts exothermally by forming the inorganic resin. In the known two-component system it is provided that component B additionally includes a non-reactive phosphate dispersing agent, and that both components each have a viscosity of 700 to 10,000 Centipoise at 25° C. In EP-PS 0 136 378 it is furthermore proposed that component A includes an inert filler in an amount of up to 50 wt-% of the total weight of the components A and B, where $SiO_2$ is preferably used as filler, and where the filler is a preformed, cellular material. Both components of the known two-component system may include a water-repellent, surface-active agent in a total amount of 0.2 to 5 wt-% of the total weight of components A and B, where the agent consists of hydrophobic $SiO_2$, a titanate, a silicone, a wax or a stearate. Component A has a solids content of 20 to 70 wt-%. For producing a resin with a cellular structure, the known two-component system is modified such that both components A and B contain a water-repellent, surface-active agent, that component B contains an expanding agent which can release a gas into the slurry by reaction, decomposition or evaporation, and that the dispersing agent does not raise the pH value of the slurry above 10. As expanding agent there is preferably used $CaCO_3$ in an amount of 0.2 to 15 wt-% of the total weight of components A and B.

The EP-PS 0 147 390 discloses a material which can be used for fireproofing and insulating purposes, and which consists of MgO, $Al_2O_3$, aluminium dihydrogen phosphate and water. This material is obtained from a non-ammoniacal, formable mixture of MgO, $Al_2O_3$, an aggregate and an acid solution of aqueous aluminium dihydrogen phosphate. As aggregate there are preferably used glass beads, pearlites, stones or refractory materials. The material may for instance contain 10 wt-% MgO, 30 wt-% $Al_2O_3$, 30 wt-% aggregate and 30 wt-% acid solution. The material known from EP-PS 0 147 390 is used for coating panels.

The German patent 195 24 563 proposes an inorganic foamed material, consisting of 40 to 90 parts by weight of a solution that contains 20 to 70 wt-% $Al(H_2PO_4)_3$ and 30 to 80 wt-% water, 5 to 55 parts by weight of a mixture that contains 10 to 70 wt-% MgO, 10 to 70 wt-% mica, 10 to 70 wt-% aluminium hydroxide and 2 to 20 wt-% $MnO_2$, as well as 1 to 30 parts by weight of a foaming agent that contains 3 to 33 wt-% $H_2O_2$ and 67 to 97 wt-% water. This foamed material can be used for fireproofing as well as for heat and sound insulation.

It was noted that the inorganic foamed material proposed in the German patent 195 24 563 must be improved with respect to its processability, must be changed and modified with respect to certain properties, and must be improved with respect to its economy and cheapness. It is therefore the object underlying the invention to improve the foamed material described above with respect to its processability, to modify the same with respect to its properties and thereby extend or improve its applicability, and to increase its economy by using suit-able, inexpensive raw materials.

The object underlying the invention is solved by a foamed material for fireproofing and/or insulating purposes as stated above, where the mixture additionally contains 1 to 60 wt-% of at least one inorganic filler and/or 1 to 60 wt-% of at least one organic processing aid. In accordance with the invention it is furthermore provided that as inorganic filler there are used bauxite, boric acid, borax, cordierite, feldspars, gypsum, kaolins, lepidolite, lithium salts, magnesium hydroxide, mullite, pearlites, chamotte, silicon carbide, spodumene, clays, vermiculite, zeolites, and/or materials with an $SiO_2$ content >70 wt-%, and that as organic processing aid there are used polyacrylic acid esters, polyurethanes, polyvinyl alcohol, polyethylene, latices, starch, cellulose, dextrins, molasses and/or ligninsulfonic acids. The foaming factor of the inventive foamed material is about 2 to about 10, i.e. the volume of the foamed material is about 2 to 10 times as large as the volume of the starting materials. The inventive foamed material has a relatively high mechanical strength dependent on the volumetric weight, and has a volumetric weight of about 100 to 800 $kg/m^3$. It can very well be used for heat and sound insulation; its thermal conductivity is very low. When the inventive foamed material contains no or small amounts of organic processing aids, it is non-flammable and therefore particularly suited for fireproofing purposes. Due to the inorganic fillers boric acid, borax and lithium salts, the crack formation in the foamed material is suppressed when during its use for fireproofing purposes it is exposed to high temperatures, since boric acid, borax and lithium salts act as sintering aids at high temperatures and therefore suppress the crack formation in the foamed material. The inorganic fillers bauxite, gypsum, magnesium hydroxide and zeolites are chiefly used for binding water, which is introduced into the foamed material by the aluminium diyhdrogen phosphate solution and the $H_2O_2$ solution. Due to the binding of water a cooling effect is achieved. The inorganic fillers cordierite, feldspars, lepidolite, mullite, chamotte, silicon carbide, spodumene and materials with an $SiO_2$ content larger than 70 wt-% advantageously reduce the thermal expansion of the inventive foamed material, which has a positive influence on the dimensional stability and mechanical strength of the foamed materials exposed to elevated temperatures or changing temperatures. By using the inorganic fillers kaolins and clays, the plasticity of the inventive foamed material is increased and the pore structure is refined. The foamed materials modified with clays and/or kaolins have good strength properties in particular when they are used for sound insulation, as their structure is not even changed by sound waves of a low frequency. The inorganic fillers pearlites and vermiculite reduce the specific gravity and increase the heat-insulating effect of the inventive foamed material in an advantageous way, so that these fillers are used in particular when the foamed material is employed for fireproofing or heat insulation purposes.

Bauxite is an $Al_2O_3$ contaminated with iron oxide, which in addition contains water and minor amounts of $SiO_2$. Cordierite is a magnesium-aluminium silicate of the formula $Mg_2Al_4Si_5O_{18}$. Feldspars are complex silicates of aluminium, which have two cleavage planes extending approximately vertical to each other. The feldspars include for instance the minerals albite and anorthite. Hydrolyzed alumosilicates are referred to as kaolins. Lepidolite is a potassium-lithium alumosilicate, which is present in the form of small flakes. As lithium salts, there are preferably used LiF and LiCl. Mullite is a rhombically crystallized alumosilicate with the composition $3Al_2O_3$ x $SiO_2$ to $2Al_2O_3$ x $SiO_2$. Pearlites are very light types of pumiceous foamed rock, which are produced from certain types of volcanic rock by means of heating. Chamotte is a heavily burnt, comminuted, refractory clay. Spodumene is a lithium-aluminium silicate and has the composition $LiAl(Si_2O_6)$. Clays are alumosilicates with phyllo-silicate structure and varying water content. Vermiculite is a magnesium-aluminium silicate with changing contents of trivalent iron. Zeolites are crystalline, hydrous alkali and alkaline earth alumosilicates, which upon heating release their water constantly and without changing the crystal structure. As inorganic filler there may also be used materials having an $SiO_2$ content larger than 70 wt-%, such as fly ash, glass or glass frit.

The organic processing aids on the one hand increase the green strength of the inventive foamed material, i.e. they increase the dimensional stability and the mechanical strength of the foamed material during the curing process. Such effect is exhibited in particular by molasses, starch and dextrins. The processing aids also have a dispersing effect on the inorganic solids, where in particular polyvinyl alcohol and ligninsulfonic acids act as dispersing agents. A plastification of the inventive foamed material is achieved in particular by the polyacrylic acid esters, polyurethanes, polyethylene, latices, polvinyl alcohol, starch, dextrins and cellulose used as processing aids, where the cellulose may be used in the form of powder or fibers. The organic processing aids are added to the solids mixture during the production of the foamed material.

In accordance with a further aspect of the invention it is provided that the mixture contains 1 to 50 wt-% boric acid, 1 to 60 wt-% clays, 1 to 60 wt-% chamotte and/or 1 to 50 wt-% pearlite as inorganic filler. In accordance with a further aspect of the invention it is furthermore provided that the mixture contains 1 to 40 wt-% starch, cellulose and/or dextrins as organic processing aid. The foamed materials thus modified in particular have a good thermal shock resistance, i.e. the foamed materials maintain their mechanical strength even in the case of frequently changing temperatures.

It was surprisingly found out that the $MnO_2$ contained in the foamed material can be replaced wholly or in part by $Fe_2O_3$ and/or $Cr_2O_3$, as these two oxides as well catalyze the decomposition of $H_2O_2$ by forming oxygen, namely with such a speed that a controlled foaming is possible. The oxides of iron and chromium used instead of $MnO_2$ contain for instance calcium oxide, magnesium oxide, barium oxide and/or copper oxide as impurities. The substitution of $MnO_2$ by $Fe_2O_3$ and/or $Cr_2O_3$ has an advantageous effect on the cheapness of the inventive foamed material.

In accordance with the invention it turned out to be expedient in some cases that the mixture contains 10 to 70 wt-% aluminium hydroxide and/or that the mixture contains 10 to 70 wt-% mica. The aluminium hydroxide preferably has a positive influence on the strength properties of the foamed material, whereas the mica in particular has a positive influence on the plasticity of the foamed material. It was surprisingly found out that the mica can be replaced by talcum wholly or in part. This does not disadvantageously influence the properties of the foamed material, but the product is made cheaper by using talcum.

Micas are alumosilicates cleavable according to one plane, which have a light colour (muscovite) or a dark colour (biotite, phlogopite). The hardness of the micas lies in the range between 2 and 3, and their density is 2.7 to 3.1. The micas are available in up to 0.1 μm thin, flexible platelets. Talcum is a magnesium silicate and forms mica-like aggregates. The aluminium hydroxide used in accordance with the invention has an $Al(OH)_3$ content larger than 98%.

The foamed material in accordance with the invention has a very wide range of applications. It can advantageously be used for fireproofing and heat insulation in the iron and steel industry, in furnace building, in chimney building, in prefabricated house building and in shipbuilding. Boilers, pipes, oil tanks, steel girders and chemical tanks may also be enclosed with the foamed material in particular with the purpose of heat insulation. Finally, the foamed material may be used in vehicle construction and in doors, windows and floors for sound and/or heat insulation.

The inventive foamed material is produced by means of a process where first of all the mixture containing MgO and $MnO_2$ as well as possibly mica, aluminium hydroxide, at least one inorganic filler and/or at least one organic processing aid is dispersed in the aqueous $Al(H_2PO_4)_3$ solution by stirring at room temperature, where then the foaming agent is introduced into the dispersion by stirring, where the mixture is subsequently filled into cavities, where the foaming period is 0.5 to 10 minutes, and where finally the foamed material is cooled to room temperature. Foaming is effected by the oxygen produced by the decomposition of $H_2O_2$. During the foaming period, heating takes place due to the exothermal reaction of $Al(H_2PO_4)_3$ with the MgO or the mica or the aluminium hydroxide, and at the same time an increase in volume by a factor of 2 to 10 takes place due to foaming. The curing time of the foam formed may be varied between one minute and 24 hours. The production process provides for short mixing times for the individual components of the foamed material as well as for a slow and uniform foam formation and curing of the foam. Furthermore, the process provides for an independent adjustment of the foaming period and of the foaming factor by varying the amount of $H_2O_2$ and manganese dioxide on the one hand and of the curing time of the foam by varying the amount of MgO on the other hand. The foam formed is finely pored and therefore particularly stable; it is therefore particularly suited for foaming large volumes. The foamed material has a high strength as well as a good plasticity; these properties can be positively influenced in particular by the inorganic fillers and the organic processing aids. Mixing the constituents of the foamed material is advantageously effected merely in a mixing unit.

The subject-matter of the invention will subsequently be explained in detail with reference to two embodiments.

Tables 1 and 2 indicate two possible compositions of the inventive foamed material. Both compositions each contain an inorganic filler which consists of several substances. The composition of Table 2 in addition contains an organic processing aid. The compositions are processed to obtain foamed materials such that the aqueous $Al(H_2PO_4)_3$ solution is first of all provided in a stirred tank, and that then the mixture is introduced into this solution under intensive stirring at room temperature. About one minute after introducing the mixture into the solution, the foaming agent is added under intensive stirring. After a mixing time of about 10 seconds, foaming takes place for about 90 seconds, where the original volume of the mixture increases to about 400 to 500%. After about 15 minutes, the foam is withdrawn from the stirred tank; thus, the stirred tank is used as mold. Until the foamed material is withdrawn from the stirred tank, a certain hardening takes place, but no final solidification. After 1 to 3 days, the block of foamed material withdrawn from the stirred tank is cut into individual specimens, which for complete solidification are stored in air for a few days. After a fortnight, the specimens will be examined. After a fortnight, the foamed material in accordance with Table 1 has a volumetric weight of 0.18 $g/cm^3$ and a bending strength of 4.5 $N/cm^2$. After a fortnight, the foamed material in accordance with Table 2 has a volumetric weight of 0.22 $g/cm^3$ and a bending strength of 13 $N/cm^2$. Due to the use of the organic processing aid, the bending strength of the foamed material in accordance with Table 1 is thus increased by about 200%. The compositions of Tables 1 and 2 can of course also be processed in smaller proportional amounts to obtain a foamed material.

The MgO used has a purity >95%, and the $Al(OH)_3$ has a purity >98%. The particle size of the manganese dioxide is below 100 μm. The particle size of the mica is about 60 mesh. The particle size of the chamotte is <63 μm for 97%. The particle size of the clay is <63 μm for 95%. The starch used has a bulk weight between 0.3 and 0.5 $kg/dm^3$.

TABLE 1

| 58 parts by weight (kg) solution | 29 kg $Al(H_2PO_4)_3$ | = 50 wt-% |
|---|---|---|
| | 29 kg $H_2O$ | = 50 wt-% |
| | 58 kg solution | = 100 wt-% |
| 40.2 parts by weight (kg) mixture | 16 kg MgO | = 39.8 wt-% |
| | 5 kg mica | = 12.4 wt-% |
| | 5 kg $Al(OH)_3$ | = 12.4 wt-% |
| | 2.2 kg $MnO_2$ | = 5.5 wt-% |
| | 12 kg filler | = 29.9 wt-% |
| | 40.2 kg mixture | = 100 wt-% |
| 12 parts by weight (kg) filler | 1 kg $H_3BO_3$ | = 2.5 wt-% |
| | 7 kg chamotte | = 17.4 wt-% |
| | 4 kg clay | = 10.0 wt-% |
| | 12 kg filler | = 29.9 wt-%, based on the mixture |
| 4 parts by weight (kg) faoming agent | 0.72 kg $H_2O_2$ | = 18 wt-% |
| | 3.28 kg $H_2O$ | = 82 wt-% |
| | 4.0 kg foaming agent | = 100 wt-% |

TABLE 2

| 58 parts by weight (kg) solution | 29 kg $Al(H_2PO_4)_3$ | = 50 wt-% |
|---|---|---|
| | 29 kg $H_2O$ | = 50 wt-% |
| | 58 kg solution | = 100 wt-% |
| 50.2 parts by weight | 16 kg MgO | = 31.8 wt-% |

TABLE 2-continued

| (kg) mixture | 5 kg mica | = 10.0 wt-% |
|---|---|---|
| | 5 kg $Al(OH)_3$ | = 10.0 wt-% |
| | 2.2 kg $MnO_2$ | = 4.4 wt-% |
| | 12 kg filler | = 23.9 wt-% |
| | 10 kg starch | = 19.9 wt-% |
| | 50.2 kg mixture | = 100 wt-% |
| 12 parts by weight (kg) filler | 1 kg $H_3BO_3$ | = 2.0 wt-% |
| | 7 kg chamotte | = 13.9 wt-% |
| | 4 kg clay | = 8.0 wt-% |
| | 12 kg filler | = 23.9 wt-%, based on the mixture |
| 10 parts by weight (kg) processing aid | 10 kg starch | = 19.9 wt-%, based on the mixture |
| 4 parts by weight (kg) foaming agent | 0.72 kg $H_2O_2$ | = 18 wt-% |
| | 3.28 kg $H_2O$ | = 82 wt-% |
| | 4.0 kg foaming agent | = 100 wt-% |

We claim:

1. A foamed material for fireproofing and/or insulating purposes, consisting of 30 to 90 parts by weight of a solution that contains 20 to 70 wt-% $Al(H_2PO_4)_3$ and 30 to 80 wt-% water, 5 to 55 parts by weight of a mixture that contains 10 to 70 wt-% MgO, 0 to 70 wt-% mica, 0 to 70 wt-% aluminium hydroxide and 1 to 20 wt-% $MnO_2$, as well as 1 to 30 parts by weight of a foaming agent that contains 3 to 33 wt-% $H_2O_2$ and 67 to 97 wt-% water, characterized in that the mixture additionally contains 1 to 60 wt-% of at least one inorganic filler and/or 1 to 60 wt-% of at least one organic processing aid.

2. The foamed material as claimed in claim 1, characterized in that as inorganic filler there are used bauxite, boric acid, borax, cordierite, feldspars, gypsum, kaolins, lepidolite, lithium salts, magnesium hydroxide, mullite, pearlites, chamotte, silicon carbide, spodumene, clays, vermiculite, zeolites, and/or materials with an $SiO_2$ content >70 wt-%.

3. The foamed material as claimed in claim 1, characterized in that as organic processing aid there are used polyacrylic acid esters, polyurethanes, polyvinyl alcohol, polyethylene, latices, starch, cellulose, dextrins, molasses and/or ligninsulfonic acids.

4. The foamed material as claimed in claim 1, characterized in that as inorganic filler the mixture contains 1 to 50 wt-% boric acid, 1 to 60 wt-% clays, 1 to 60 wt-% chamotte, and/or 1 to 50 wt-% pearlite.

5. The foamed material as claimed in claim 1, characterized in that as organic processing aid the mixture contains 1 to 40 wt-% starch, cellulose and/or dextrins.

6. The foamed material as claimed in claim 1, characterized in that the $MnO_2$ has been replaced wholly or in part by $Fe_2O_3$ and/or $Cr_2O_3$.

7. The foamed material as claimed in claim 1, characterized in that the mixture contains 10 to 70 wt-% aluminium hydroxide.

8. The foamed material as claimed in claim 1, characterized in that the mixture contains 10 to 70 wt-% mica.

9. The foamed material as claimed in claim 1, characterized in that the mica has been replaced wholly or in part by talcum.

* * * * *